United States Patent
Gayles et al.

(10) Patent No.: US 11,894,682 B2
(45) Date of Patent: Feb. 6, 2024

(54) METHODS AND SYSTEMS FOR OFF-GRID LOAD STABILIZATION OF ENERGY DISTRIBUTION SYSTEMS

(71) Applicant: Caterpillar Inc., Deerfield, IL (US)

(72) Inventors: Ronald Christopher Gayles, Peoria, IL (US); Dachuan Yu, Dunlap, IL (US); Gregory J. Speckhart, Peoria, IL (US)

(73) Assignee: Caterpillar Inc., Peoria, IL (US)

(*) Notice: Subject to any disclaimer, the term of this patent is extended or adjusted under 35 U.S.C. 154(b) by 931 days.

(21) Appl. No.: 16/875,622

(22) Filed: May 15, 2020

(65) Prior Publication Data
US 2021/0359521 A1  Nov. 18, 2021

(51) Int. Cl.
| | |
|---|---|
| *H02J 3/32* | (2006.01) |
| *H02J 3/00* | (2006.01) |
| *H02J 7/00* | (2006.01) |
| *H02J 3/14* | (2006.01) |
| *H02J 3/38* | (2006.01) |

(52) U.S. Cl.
CPC .............. *H02J 3/32* (2013.01); *H02J 3/003* (2020.01); *H02J 3/14* (2013.01); *H02J 3/381* (2013.01); *H02J 7/0048* (2020.01); *H02J 2310/56* (2020.01)

(58) Field of Classification Search
CPC ...... H02J 3/32; H02J 3/003; H02J 3/14; H02J 3/381; H02J 7/0048; H02J 2310/56; H02J 3/38; H02J 3/48; H02J 13/00004; H02J 2300/10; H02J 2310/40; Y02B 70/3225; Y04S 20/222
See application file for complete search history.

(56) References Cited

U.S. PATENT DOCUMENTS

| | | |
|---|---|---|
| 8,975,767 B2 | 3/2015 | Algrain |
| 9,148,020 B2 | 9/2015 | Yamada |
| 9,634,508 B2 | 4/2017 | Kearns et al. |
| 9,948,096 B2 | 4/2018 | Markowz et al. |
| 10,410,153 B2* | 9/2019 | Fife ...................... G01R 31/367 |
| 2012/0228950 A1 | 9/2012 | Sakai |
| 2014/0094985 A1* | 4/2014 | Hibiya .................. G05B 15/02 |
| | | 700/297 |
| 2014/0103727 A1 | 4/2014 | Taimela |
| 2015/0021998 A1 | 1/2015 | Trescases et al. |
| 2016/0248263 A1 | 8/2016 | Hunt |
| 2019/0385182 A1* | 12/2019 | Price ...................... G06Q 50/06 |
| 2020/0000501 A1 | 1/2020 | Gephart |
| 2020/0313431 A1* | 10/2020 | Kim ......................... H02J 3/32 |

\* cited by examiner

*Primary Examiner* — Zhipeng Wang
(74) *Attorney, Agent, or Firm* — BOOKOFF McANDREWS, PLLC

(57) ABSTRACT

The present disclosure discloses methods, systems, and non-transitory computer-readable medium for off-grid load stabilization. For instance, the method may include: receiving generator data from at least one generator and energy storage data from at least one energy store; determining, based on the generator data and/or the energy storage data, a moving average of a system load of the at least one generator; and determining, based on the generator data and/or the energy storage data, an instantaneous load value of the at least one generator. The method may further include: determining a first electronic storage dispatch (ESD) based on the moving average of the system load and the instantaneous load value of the at least one generator; and providing the first ESD to the at least one energy store.

20 Claims, 5 Drawing Sheets

METHODS AND SYSTEMS FOR OFF-GRID LOAD STABILIZATION OF ENERGY DISTRIBUTION SYSTEMS

TECHNICAL FIELD

The present disclosure relates generally to off-grid load stabilization.

BACKGROUND

Off-grid power generation systems may experience changes in load, e.g., due to individual electrical loads being added, removed, or used. The changes in load may reduce power quality of the off-grid power generation system due to delay in power system bus frequency returning to a nominal value.

U.S. Patent Application No. 2015/0021998 A1 ("the '998 application") to Trescases et al., filed on Jul. 17, 2014, discloses a stabilized power generation apparatus for, e.g., photovoltaic or wind turbine power generators. The stabilized power generator of the '998 application includes a power generating component, an energy store, a bi-directional Direct Current (DC)/DC converter, and a bi-directional DC/Alternating Current (AC) converter, where the bi-directional DC/DC converter is electrically coupled between the power generating component and the energy store. Meanwhile, the bi-directional DC/AC converter is electrically coupled at a DC side of the bi-directional DC/AC converter to a circuit path between the power generating component and the bi-directional DC/DC converter, and is to be electrically coupled at an AC side of the bi-directional DC/AC converter to an electrical grid. Therefore, the '998 application provides distributed storage at each power generator, and the converters are controllable to provide Maximum Power Point tracking in photovoltaic systems, power smoothing, and/or maintenance of State of Charge (SOC) of the energy store. However, the system of the '998 application does not provide for an ability to instantaneously inject/absorb power to stabilize the load and resulting bus frequency.

The systems and methods of the present disclosure may solve one or more of the problems set forth above and/or other problems in the art. The scope of the current disclosure, however, is defined by the attached claims, and not by the ability to solve any specific problem.

SUMMARY OF THE DISCLOSURE

According to one aspect, the present disclosure includes a method for off-grid load stabilization. The method including: receiving generator data from at least one generator and energy storage data from at least one energy store; determining, based on the generator data and/or the energy storage data, a moving average of a system load of the at least one generator; determining, based on the generator data and/or the energy storage data, an instantaneous load value of the at least one generator; determining a first electronic storage dispatch (ESD) based on the moving average of the system load and the instantaneous load value of the at least one generator; and providing the first ESD to the at least one energy store.

According to another aspect, the present disclosure includes a system for off-grid load stabilization. The system including: at least one memory storing instructions; and at least one processor executing the instructions to perform operations. The operations including: receiving generator data from at least one generator and energy storage data from at least one energy store; determining, based on the generator data and/or the energy storage data, a moving average of a system load of the at least one generator; determining, based on the generator data and/or the energy storage data, an instantaneous load value of the at least one generator; determining a first electronic storage dispatch (ESD) based on the moving average of the system load and the instantaneous load value of the at least one generator; and providing the first ESD to the at least one energy store.

According to yet another aspect, the present disclosure includes a non-transitory computer-readable medium storing instructions that, when executed by a processor, cause the processor to perform operations for off-grid load stabilization. The operations including: receiving generator data from at least one generator and energy storage data from at least one energy store; determining, based on the generator data and/or the energy storage data, a moving average of a system load of the at least one generator; determining, based on the generator data and/or the energy storage data, an instantaneous load value of the at least one generator; determining a first electronic storage dispatch (ESD) based on the moving average of the system load and the instantaneous load value of the at least one generator; and providing the first ESD to the at least one energy store.

BRIEF DESCRIPTION OF THE DRAWINGS

The accompanying drawings, which are incorporated in and constitute a part of this specification, illustrate various exemplary embodiments and together with the description, serve to explain the principles of the disclosure.

DETAILED DESCRIPTION

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a process, method, article, or apparatus that comprises, has, or includes a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in the stated value. The term "exemplary" is used in the sense of "example" rather than "ideal." As used herein, the singular forms "a," "an," and "the" include plural reference unless the context dictates otherwise.

Figure 1:
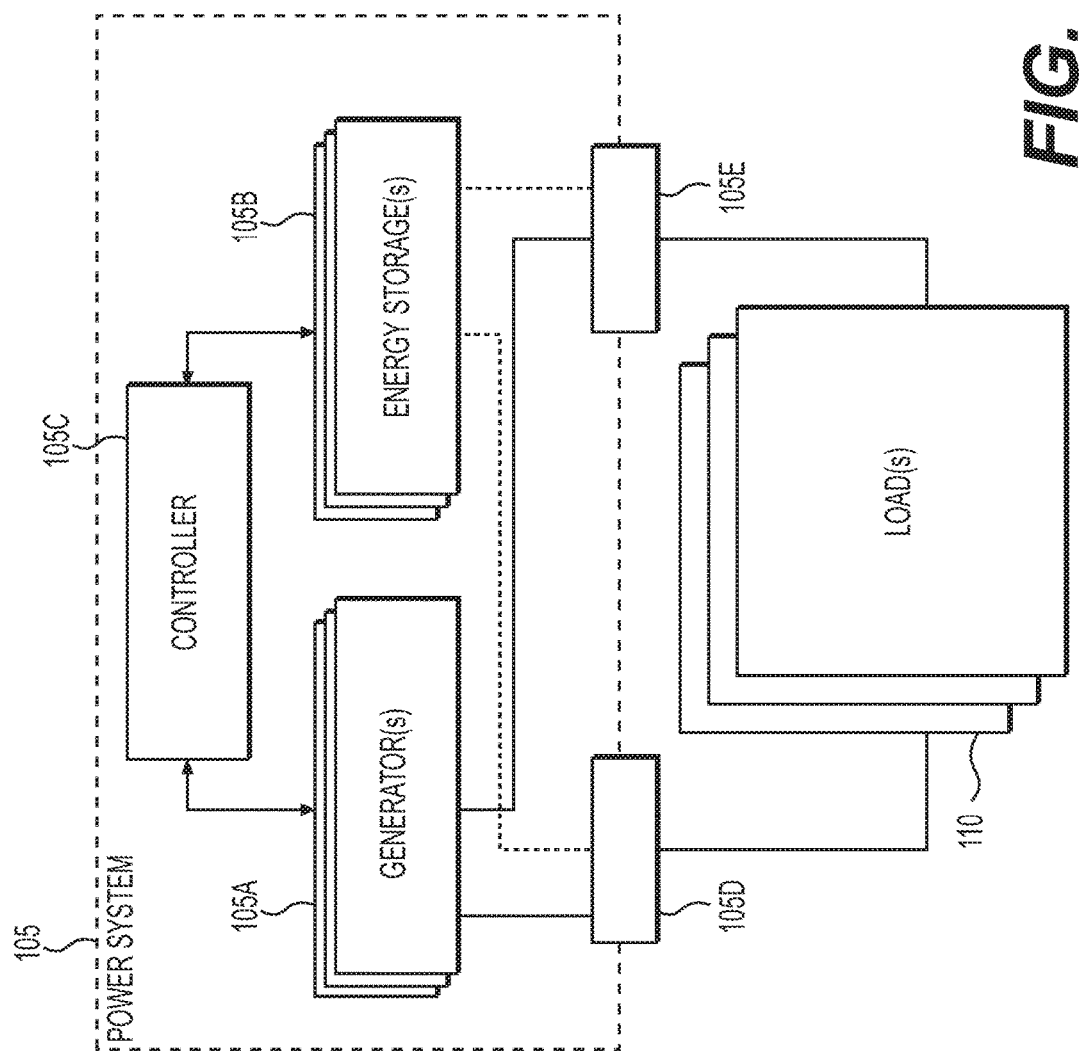
FIG. 1 depicts an exemplary block diagram of a system for off-grid load stabilization, according to one or more embodiments.

FIG. 1 depicts an exemplary block diagram of a system 100 for off-grid load stabilization, according to one or more embodiments. The system 100 may include a power system 105, and at least one load 110. The power system 105 may include at least one generator 105A, at least one energy store 105B, a controller 105C, and/or interfaces 105D and 105E.

The power system 105 may be an off-grid electrical power distribution system that may provide power to the at least one load 110. Specifically, the power system 105 may provide electrical power to the at least one load 110, as discussed in detail below. Generally, the power system 105 may provide alternating current (AC) power at a particular voltage and particular current. Moreover, the power system 105 may include the interfaces 105D and 105E, the controller 105C, at least one of the generators 105A, and at least one of the energy stores 105B. The at least one of the energy store 105B may be controlled by the controller 105C to instantaneously inject power when power is needed by the power system 105 or instantaneously absorb surplus power generated by the power system 105. Accordingly, the at least one of the energy store 105B (controlled by the controller 105) may act as a power consumer on the at least one generator 105A or as a power source with the at least one generator 105A, to thereby ensure system bus frequencies of the at least one generator 105A are maintained at a nominal value. The controller 105C may be integrated with, or separate from (but connected to), the interfaces 105D and 105E, the at least one of the generators 105A, and at least one of the energy stores 105B, or combinations thereof. In this manner, a user may add or remove generators 105A to increase/reduce system power generation and/or add or remove energy stores 105B to increase/reduce system energy storage capacity, in accordance with a user's preference. For instance, a user may prefer to add additional generators 105A and/or add additional energy stores 105B to increase load capacity if additional loads 110 are expected to be connected to the power system 105, or remove generators 105A and/or remove energy stores 105B to decrease load capacity if loads 110 are expected to be disconnected from the power system 105.

Generally, in this disclosure, "off-grid" may mean that the electrical power distribution system is not connected to a larger electrical power distribution system run by, e.g., an electric utility or other large-scale electric power generation plant that serves electricity to a geographic area, campus, compound, etc. However, techniques disclosed herein may still be applied to electrical power distribution systems that are connected to larger electrical power distribution systems. For instance, the larger electrical power distribution systems may operate as a power source in a primary provider role or secondary provider role, while the power system 105 may operate as a power source in the other of the primary provider role or secondary provider role.

The at least one load 110 may be any device that can connect to a power distribution system, such as the power system 105, to receive electrical power. Examples loads may include heavy machinery, personal devices, appliances, HVAC systems, a personal residence electrical distribution system, etc. Generally, the at least one load 110 may receive the power from the power system 105 and use the power in accordance with the operations of the at least one load 110. Users of the power system 105 and the at least one load 110 may connect/disconnect the at least one load 110 by electrically connecting the at least one load 110 to the interfaces 105D and 105E of the power system 105. For instance, the interfaces 105D and 105E may have AC plugs/sockets to connect the at least one load 110 in parallel to the at least one generator 105A and the at least one energy store 105B of the power system 105.

The interfaces 105D and 105E may also have a plurality of generator connections and a plurality of energy store connections. The plurality of generator connections may be hardwired electrical connections and/or AC plugs/sockets to connect the at least one generator 105A in parallel to the at least one load 110 and the at least one energy store 105B. The plurality of energy store connections may be hardwired electrical connections and/or AC plugs/sockets to connect the at least one energy store 105B in parallel to the at least one load 110 and the at least one generator 105A. For instance, as discussed above, the power system 105 may or may not allow addition/removal of generators 105A and/or addition/removal of energy stores 105B. Therefore, depending on a configuration, the interfaces 105D and 105E may include: (1) hardwired electrical connections that connect the at least one generator 105A; (2) AC plugs/sockets to connect/disconnect the at least one generator 105A; (3) hardwired electrical connections that connect the at least one energy store 105B; and/or (4) AC plugs/sockets to connect/disconnect the at least one energy store 105B.

The at least one generator 105A may provide AC power to the power system 105, which may provide the AC power to the at least one load 110. Generally, the at least one generator 105A may be any device that converts motive power (mechanical energy) into electrical power to output the AC power. In one aspect of the disclosure, the at least one generator 105A may be gas turbine electrical generators. In such gas turbine electrical generators, fast changes in load from the at least one load 110 may cause a system bus frequency to deviate from a nominal value. The system bus frequency may be the frequency of electrical components of the at least one generator 105A. For instance, such gas turbine electrical generators may have isochronous frequency control governors that may try to maintain the system bus frequency to the nominal value in response to changes of the load of the at least one load 110. Therefore, during a transient load charge (e.g., a load transient), the system bus frequency will change as the load on the at least one generator 105A changes. However, a rate of return of the system bus frequency back to the nominal value is slower than a desired rate due to an inertia of motion of physical components (e.g., a rotor of a stator-rotor) of the at least one generator 105A. The slow rate of return may reduce power quality of the power system 105. The power quality of the power system 105 may be determined based on the voltage, frequency, and waveform of the power output to the at least one load 110. A high power quality may ensure continuity of service for the at least one load 110, such that the at least one load 110 are able to properly function as intended. A low power quality may cause the at least one load 110 to malfunction, fail prematurely, or not operate at all.

Therefore, avoiding load transients may be beneficial in providing better power quality. However, generally, controlling a load of the at least one load may not be possible or desirable. Instead, as discussed in below, the controller 105C may control the at least one energy store 105B to act as a power consumer or an energy source, so that the at least one generator 105A may maintain the system bus frequency at the nominal value, thereby ensuring better power quality.

The at least one generator 105A may also include communication interfaces. The communication interfaces of the at least one generator 105A may enable the at least one generator 105A to communicate with the controller 105C. For instance, the at least one generator 105A may be connected to the controller 105C by wired or wireless communication. The at least one generator 105A may provide the controller 105C with generator data. The generator data, for each of the at least one generator 105A, may include load data and/or generator parameters. The load data may include a current (e.g., instantaneous) load seen by the at least one generator 105A and/or past load data (if at least one generator 105A store such data locally). The current load/past load data may include voltage (e.g., in volts) and/or current (e.g., in amperes) measured by a voltmeter and/or ammeter, respectively, included in the generator. The generator parameters may include a generator set maximum threshold value and a generator set minimum threshold value. Alternatively, to reduce transmission bandwidth, the generator data may omit the generator parameters, and the at least one generator 105A may transmit the generator parameters during an initial configuration process between the at least one generator 105A and the controller 105C (e.g., when a generator 105A is connected to the controller 105 the first time). The generator set maximum threshold value and the generator set minimum threshold value may indicate a maximum power load and a minimum power load, respectively, that a generator may support.

The at least one energy store 105B may be any energy storage device that can output AC power. For instance, the at least one energy store 105B may be at least one of: electrical-chemical energy storage (such as a battery), electrical energy storage (such as a capacitor, a supercapacitor, or a superconducting magnetic energy storage), mechanical energy storage (such as a fly wheel, pump system, etc.), and/or any combination thereof. The at least one energy store 105B may include inverters (individually or collectively) so that the at least one energy store 105B may operate as a power consumer or a power source. The at least one energy store 105B may also include electronic control mechanisms to control (1) how much load the at least one energy store 105B draw or (2) how much AC power the at least one energy store 105B output.

The at least one energy store 105B may also include communication interfaces. The communication interfaces of the at least one generator 105A may enable the at least one energy store 105B to communicate with the controller 105C. For instance, the at least one energy store 105B may be connected to the controller 105C by wired or wireless communication. The at least one energy store 105B may provide the controller 105C with energy storage data and receive instructions from the controller 105C.

The energy storage data may include, for each of the at least one energy store, a current energy level (e.g., kilowatt-hours currently stored), total energy storage capacity (e.g., kilowatt-hours of capacity), and/or discharge/charge parameters. The current energy level may be measured by a battery meter of an energy storage. The battery meter may one or combinations of: a voltmeter, an amp-hour meter, and/or an impedance based meter. The discharge/charge parameters may indicate an amount of discharge power and an amount of charge power for the energy store(s) 105B. Alternatively, to reduce transmission bandwidth, the energy storage data may omit the discharge/charge parameters, and the at least one energy store 105B may transmit the discharge/charge parameters when the at least one energy store 105B are first connected to the controller 105C. The at least one energy store 105B may receive requests for the energy storage data to provide the energy storage data and/or continuously provide the energy storage data to the controller 105C. The instructions may include an energy storage dispatch instructions (ESD). An ESD may comprise an instruction to inject power to the system bus of the power system 105 or absorb power from the system bus of the power system 105. In techniques presented herein, at least one ESD may be utilized to rapidly stabilize the load, thereby stabilizing the bus frequency of the power system 105 in a time efficient manner rather than attempting to stabilize the load using the generator(s) 105A alone. The at least one energy store 105B may control the inverters and the electronic control mechanisms to control (1) quantity of load drawn by the at least one energy store 105B or (2) the amount of AC power output produced by the at least one energy store 105B, in accordance with the ESD.

As mentioned above, the controller 105C may control the at least one energy store 105B to act as a near instantaneous load or energy source, so that the at least one generator 105A may maintain the system bus frequency at the nominal value, thereby ensuring better power quality. In one aspect of the disclosure, the controller 105C may control the at least one energy store 105B to instantaneously inject power when power is needed by the at least one load 110 or instantaneously absorb surplus power generated by the at least one generator 105A. Accordingly, the controller 105 regulates the power supply such that an exact amount of desired power supply flows in or out of the power system 105 at any given time. The instantaneous injecting/absorbing power may be performed to control the amount of transient load seen by the power system 105 and thus stabilize the load and resulting system bus frequency of the at least one generator 105A. The desired power may be calculated by performing a moving average of a system load and then taking a difference of the moving average and an instantaneous load value. This difference may be the desired power output/absorbed of the energy store. Causing the energy store(s) 105B to output/absorb the desired power (e.g., by transmitting the energy storage dispatch instructions) may limit the transient load seen by the at least one generator 105A.

The controller 105C may include at least one memory device storing instructions; at least one processor executing the instructions from memory device to perform a set of desired operations; and a communication interface facilitating the communication between various system components. The instructions may be non-transitory computer-readable instructions for executing a control application. The communication interface of the controller 105C may enable the controller 105C to communicate with the at least one generator 105A and the at least one energy store 105B, as discussed above.

The controller 105C, while executing the control application, may receive the generator data and the energy storage data, process the generator data and the energy storage data to generate an ESD, and output the ESD to the at least one energy store 105B, so that the at least one generator 105A are protected from transient changes in load. To process the generator data and the energy storage data to generate the ESD, the control application may include a load stabilization function and/or a state of charge (SOC) function. The control application may also include a generator set limit function and/or energy store discharge/charge limit function to generate the ESD. The load stabilization function, the SOC function, the generator set limit function, and/or the energy store discharge/charge limit function may be configured manually or may be automated. In manual configuration, the aforementioned system functions might be activated or deactivated via a user input. Alternatively, the controller 105C may automatically activate or deactivate the aforementioned system functions based on presence or absence of systems parameters (such as no generator set minimum threshold value is available, etc.). Generally, the control application may have all of the functions activated by default. Generally, the load stabilization function may ensure system bus frequencies of the at least one generator 105A are maintained at a nominal value by causing an amount of power to be absorbed/injected by the at least one energy store 105B. The amount of power may be determined based on a difference from an instantaneous load and a moving average of the load. Meanwhile, the SOC function may ensure the at least one energy store 105B are charged to a target SOC. The target SOC may enable the at least on energy store 105B to provide long term beneficial use to the system 100, such as having a range of operation usable by the power system 105 and/or avoid degradation ranges of the at least one energy store 105B.

The control application may proceed to iteratively determine an ESD for a set period of time (e.g., every millisecond), and transmit the ESD to the at least one energy store 105B. Specifically, the control application may process the generator data and the energy storage data through the load stabilization function in parallel to the SOC function to determine a first ESD, then through the generator set limit function determine a second ESD, and then through the energy store discharge/charge limit function determine a third ESD. The control application may transmit the first, second or third ESD, depending upon the function configuration indicating which functions are activated and which functions are not activated.

When the load stabilization function is activated, the controller 105C may obtain a current load of the at least one generator 105A; obtain a window set point; determine a moving average for the load based on the window set point; and determine a load smoothing power based on a difference between the moving average for the load and the current load. If no other function is activated, the controller 105C may then generate an ESD based on the load smoothing power and transmit the ESD to the at least one energy store 105B.

To determine the current load of the power system 105, the controller 105C may receive generator data from the at least one generator 105A and extract the load data. The load data may include the instantaneous load on the at least one generator 105A and/or past load data, and the controller 105C may set the instantaneous load as the current load.

The controller 105C may determine the window set point based on a current time of a system clock. For instance, the controller 105C may determine the window set point as a time frame from the current time (from the system clock) backwards a particular time period (e.g., previous second, minute, hour, etc.).

To determine the moving average for the load, the controller 105C may retrieve past load data from the memory based on the window set point and use a moving average formula (from among at least one moving average formula) for the retrieved past load data and the current load. The controller 105C may then update the past load data to include the current load of the generator data. For instance, the controller 105C may store the past load data in a buffer, in a stack data structure, in a first-in first-out linear data structure, such as a queue. One of skill in the art would recognize that there are many ways to store such time series data, therefore the types mentioned above should not be intended as limiting but merely exemplary. The moving average formulas may be one of: a simple moving average formula, cumulative moving average formula, a weighted moving average formula, an exponential moving average formula, and/or a combination thereof.

To determine the load smoothing power, the controller 105C may subtract the current load from the moving average for the load. For instance, the load smoothing power may be a positive or negative amount of load expressed in kilowatts. As an example, the ESD should instruct the at least one energy store 105B to absorb an absolute value of the amount (if the load smoothing power is positive, energy store(s) 105B acts as a power consumer) or to output the absolute value of the amount (if the load smoothing power is negative, energy store(s) 105B act as a power source), so that a current load as seen by the at least one generator 105A is the moving average for the load.

When the SOC function is activated, the controller 105C may determine a current energy sum; determine an energy at a target SOC; determine a difference between the energy at the target SOC and the current energy sum; obtain a SOC control gain; determine a SOC correction power based on (for example, by determining a product) the SOC control gain and the difference between the energy at the target SOC and the current energy sum; determine whether the limit function is on; in response to determining that the limit function is activated, limit the SOC correction power to a max SOC bias power; in response to determining that the limit function is disabled, proceed without limiting the SOC correction power; and determine a first ESD based on the load smoothing power and/or the SOC correction power. If no other function is activated, the controller 105C may then transmit the first ESD to the at least one energy store 105B.

To obtain the current energy sum, the controller 105C may extract a current energy level of the each of the energy store(s) 105B and aggregate (e.g., adding) the current energy levels of each of the energy store(s) 105B. For instance, the current energy level may be energy stored (e.g., kilowatt-hours) in the at least one energy store 105B that is readily available to be output. The current energy level of the at least one energy store 105A may be extracted either from memory or from the energy storage data stored elsewhere.

To obtain the energy at the target SOC, the controller 105C may retrieve the data from the memory (if previously obtained and/or not changed) or extract it from the received energy storage data. For instance, the control application may have a target percentage (e.g., 40%, 50%, 60%, etc.) of total energy storage capacity of the at least one energy store 105B, and may determine the energy at the target SOC by multiplying the target percentage by the total energy storage capacity of the at least one energy store 105B. The total energy storage capacity of the at least one energy store 105B may be extracted from the energy storage data.

To determine the difference between the energy at the target SOC and the current energy sum, the controller 105C may subtract the current energy sum from the energy at the target SOC. For instance, the difference may indicate whether the at least one energy store 105B are currently storing more energy than the target SOC (difference is positive) or are currently storing less energy than the target SOC (difference if negative).

To obtain the SOC control gain, the controller 105C may retrieve, from the memory, a SOC control gain variable or a SOC gain function that outputs the SOC gain variable based on inputs, such as a magnitude of the difference between the energy at the target SOC and the current energy sum or whether the difference between the energy at the target SOC and the current energy sum is positive or negative (e.g., the sign of the difference). The SOC control gain variable may indicate a convergence time from the current energy sum to the energy at the target SOC. For instance, the convergence time may be adjustable (e.g., by using the SOC gain function) to change a rate of charging/discharging of the at least one energy store 105B. For instance, if the convergence time is adjusted to a shorter time then the energy store(s) 105B may charge more rapidly, or if the convergence time is adjusted to a longer time then the energy store(s) 105B may charge more slowly.

To determine the SOC correction power, the controller 105C may divide the difference by the SOC control gain. For instance, the controller 105C may determine the SOC correction power (e.g., kilowatts) by dividing the difference (e.g., kilowatt-hours) by the convergence time (e.g., hours) to determine an amount of power (e.g., kilowatts) to be input/output to/from the at least one energy store 105B.

To determine whether the limit function is on, the controller 105C may determine whether the SOC of the at least one energy store 105B are less than a low-end critical threshold (either individually or collectively) and/or greater than a high-end critical threshold. For instance, the controller 105C may obtain the current energy level of the at least one energy store 105B and/or the current energy sum, and determine whether any of the current energy level of the individual energy stores of the at least one energy store 105B and/or the current energy sum are less than the low-end critical threshold and/or greater than the high-end critical threshold. The low-end critical threshold may be an energy value (e.g., kilowatt-hours) based on a threshold percentage (e.g., 5%, 10%, etc.) of total energy storage capacity of the at least one energy store 105B (e.g., kilowatt-hours). The high-end critical threshold may be an energy value (e.g., kilowatt-hours) based on a threshold percentage (e.g., 90%, 95%, etc.) of total energy storage capacity of the at least one energy store 105B (e.g., kilowatt-hours). In response to determining that the limit function is not activated, the controller 105C may proceed to determine the first ESD without limiting the SOC correction power.

In response to determining that the limit function is activated, the controller 105C may determine whether the SOC correction power is greater than a max SOC bias power. The max SOC bias power may be a particular power (e.g., kilowatts) that may throttle the SOC correction power so that the load smoothing power may substantially remove load transients. In response to determining that the SOC correction power is greater than the max SOC bias power, the controller 105C may set the SOC correction power to the max SOC bias power. In response to determining that the SOC correction power is not greater (e.g., equal to or less) than the max SOC bias power, the controller 105C might not adjust the SOC correction power. In this manner, the controller 105C may be limited to the SOC bias power and not override the load smoothing function.

To determine the first ESD based on the load smoothing power and the SOC correction power, the controller 105C may aggregate (e.g., add) the load smoothing power and the SOC correction power. For instance, based on magnitudes and signs of the load smoothing power and the SOC correction power, the ESD may instruct the at least one energy store 105B to absorb an amount of power (if the ESD is positive, energy store(s) 105B acting as a power consumer) or to output the amount of power (if the ESD is negative, energy store(s) 105B acting as a power source), so that a current load as seen by the at least one generator 105A becomes the moving average for the load.

In this manner, the controller 105C may charge/discharge the at least one energy store 105B for a period of time with/without consideration of the load transients on the at least one generator 105A, so that the at least one energy store 105B are capable of long term beneficial use (e.g., have a range of operation usable by the power system 105) and/or avoid degradation ranges. As an example, using the load stabilization function and transmitting an ESD based on the load smoothing power (e.g., based on a moving average) may naturally be an energy neutral operation, meaning the SOC of the at least one energy store 105B might not change over time, on average, over a period of time.

However, if the SOC becomes too high or too low, the SOC of charge may remain too high or too low (e.g., in a steady state), unless the SOC was driven to a desirable range or value. Therefore, the SOC function may drive the SOC to the target SOC (but only in accordance with the convergence time and the max SOC bias power) and may, occasionally, override the load stabilization function when the SOC of the at least one energy store 105B are less than the low-end critical threshold and/or greater than the high-end critical threshold.

When the generator set limit function is activated, the controller 105C may: determine a current net load; determine a difference between the current net load and the first ESD (the first difference); determine whether the first difference is greater than a generator set maximum threshold value or less than a generator set minimum threshold value; in response to determining that the first difference is greater than a generator set maximum threshold value, determine a second ESD by computing a second difference between the current net load and the generator set maximum threshold value; in response to determining that the first difference is less than the generator set minimum threshold value, determine the second ESD by computing a third difference between the current net load and the generator set minimum threshold value; and in response to determining that the first difference is not less than the generator set minimum threshold value and/or in response to determining that the first difference is not greater than the generator set maximum threshold value, set the first ESD as the second ESD. Therefore, the generator set limit function may ensure that the transmitted ESD does not cause current loads on the at least one generator 105A to exceed maximum or minimum loads.

To determine the current net load, the controller 105C may obtain the current load of the at least one generator 105A, as discussed above; obtain a current load on the energy store(s) 105B (if the energy store(s) 105B are acting as power sources) by extracting a current load of the energy store(s) 105B from the energy storage data; and add the energy storage power to the generator set power. For instance, the current net load may indicate a total power consumption of the at least one load 110.

To determine a difference between the current net load and the first ESD, the controller 105C may subtract the first ESD from the current net load. For instance, subtracting the first ESD from the current net load may determine what a current net load would be if the total power consumed by the at least one load 110 would be if increased or decreased by the first ESD. In this manner, the difference may indicate an expected current net load, so as to be checked against the maximum or minimum loads of the at least one generator 105A.

To determine whether the first difference is greater than a generator set maximum threshold value, the controller 105C may retrieve a generator set maximum threshold value (GEN MAX) from the memory (or from the generator data) and determine whether the first difference is greater than the GEN MAX. For instance, in the case of multiple generators, the controller 105C may retrieve a generator set maximum threshold value for each generator of the at least one generator 105A; select a lowest value of the generator set maximum threshold values as the GEN MAX; and determine whether the first difference is greater than the GEN MAX. For instance, selecting the lowest value may ensure that the generator with the lowest value is not overloaded by a load that the generator is not designed to support, thereby avoiding damage or inefficient use of the generator.

To determine whether the first difference is less than a generator set minimum threshold value, the controller 105C may retrieve a generator set minimum threshold value (GEN MIN) from the memory (or from the generator data) and determine whether the first difference is less than the GEN MIN. For instance, in the case of multiple generators, the controller 105C may retrieve a generator set minimum threshold value for each generator of the at least one generator 105A; select a largest value of the generator set minimum threshold values as the GEN MIN; and determine whether the first difference is less than the GEN MIN. For instance, selecting the largest value may ensure that the generator with the largest value is used with a load the generator was not designed to support, thereby avoiding damage or inefficient use of the generator.

To determine a difference between the current net load and the GEN MAX as the second ESD, the controller 105C may subtract the GEN MAX from the current net load. To determine a difference between the current net load and the GEN MIN as the second ESD, the controller 105C may subtract the GEN MIN from the current net load.

When the energy store discharge/charge limit function is activated, the controller 105C may determine a discharge limit and a charge limit; determine whether the second ESD is greater than the discharge limit or less than the charge limit; in response to determining that the second ESD is greater than the discharge limit, limit the second ESD to the discharge limit as a third ESD; in response to determining that the second ESD is less than the charge limit, limit the second ESD to the charge limit as the third ESD; and in response to determining that the second ESD is not greater than the discharge limit and/or in response to determining that the second ESD is not less than the charge limit, set the second ESD as the third ESD. Therefore, the energy store discharge/charge limit function may ensure that the transmitted ESD does not request a charge load of the energy store(s) 105B that exceeds a charge limit and/or request a discharge load that exceeds a discharge limit of one of the at least one energy store 105B.

To obtain the discharge limit and the charge limit of the at least one energy store 105B, the controller 105C may retrieve a discharge limit and a charge limit for each of the at least one energy store 105B from the memory. Additionally or alternatively, the controller 105C may extract the discharge limit and charge limit from the energy storage data.

To determine whether the second ESD is greater than the discharge limit, the controller 105C may determine whether the second ESD is greater than the discharge limit of the at least one energy store 105B. For instance, in the case of multiple energy stores, the controller 105C may obtain discharge limits for the energy stores; select a lowest discharge limit; and determine whether the second ESD is greater than the lowest discharge limit. For instance, selecting the lowest discharge limit may ensure that the energy store with the lowest value is not instructed to discharge more than an amount the energy storage is designed to support, thereby avoiding damage the energy store.

To determine whether the second ESD is less than the charge limit, the controller 105C may determine whether the second ESD is less than the charge limit of the at least one energy store 105B. For instance, in the case of multiple energy stores, the controller 105C may obtain charge limits for the energy stores; select a lowest charge limit; and determine whether the second ESD is less than the lowest charge limit. For instance, selecting the lowest charge limit may ensure that the energy store with the lowest value is not instructed to charge more than an amount the energy storage is designed to support, thereby avoiding damage the energy store.

The controller 105C may then transmit the first, second, or third ESD to the at least one energy store 105B (depending on which function(s) are activated). The at least one energy store 105B may control the inverters and the electronic control mechanisms of the at least one energy store 105B to control (1) how much load the at least one energy store 105B draw or (2) how much AC power the at least one energy store 105B output, in accordance with the transmitted ESD. The controller 105C may return to perform the process over again, for example at predetermined time intervals such as every millisecond, so that transient changes in load are absorbed or injected by the at least one energy store 105B.

Therefore, the systems and methods of the present disclosure may enable the at least one generator 105A to maintain the system bus frequency to the nominal value, thereby ensuring better power quality. Moreover, the systems and methods of the present disclosure may drive the SOC to the target SOC so that the at least one energy store are not steady-state maintained in a too low or too high SOC. Furthermore, the systems and methods of the present disclosure may check the ESD against acceptable generator maximum/minimum loads of the at least one generator 105A and the discharge/charge limits of the at least one energy store 105B, so as to safely operate the system.

Figure 2:
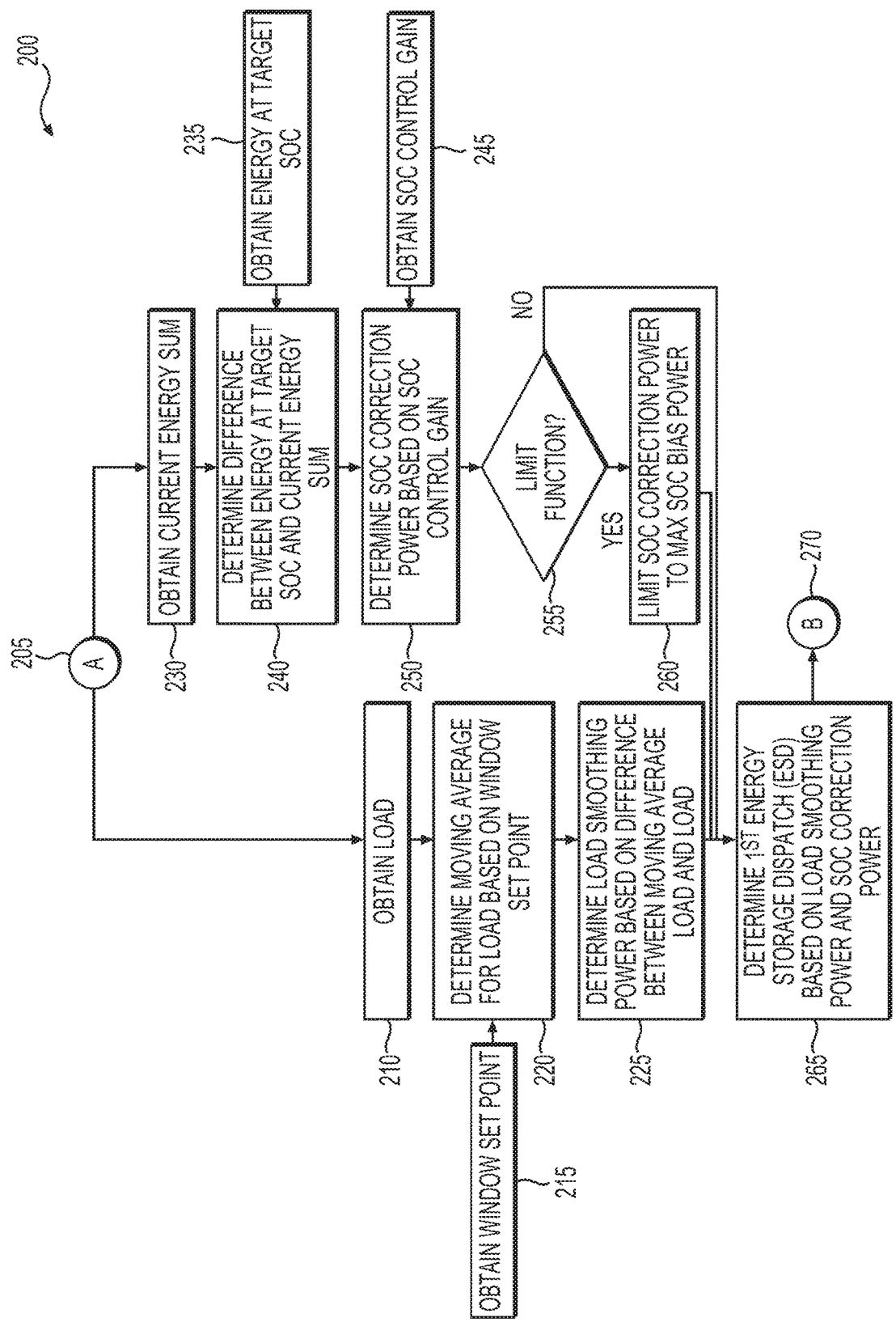
FIG. 2 depicts a flowchart for off-grid load stabilization using a load stabilization function and a SOC function, according to one or more embodiments.
Figure 3:
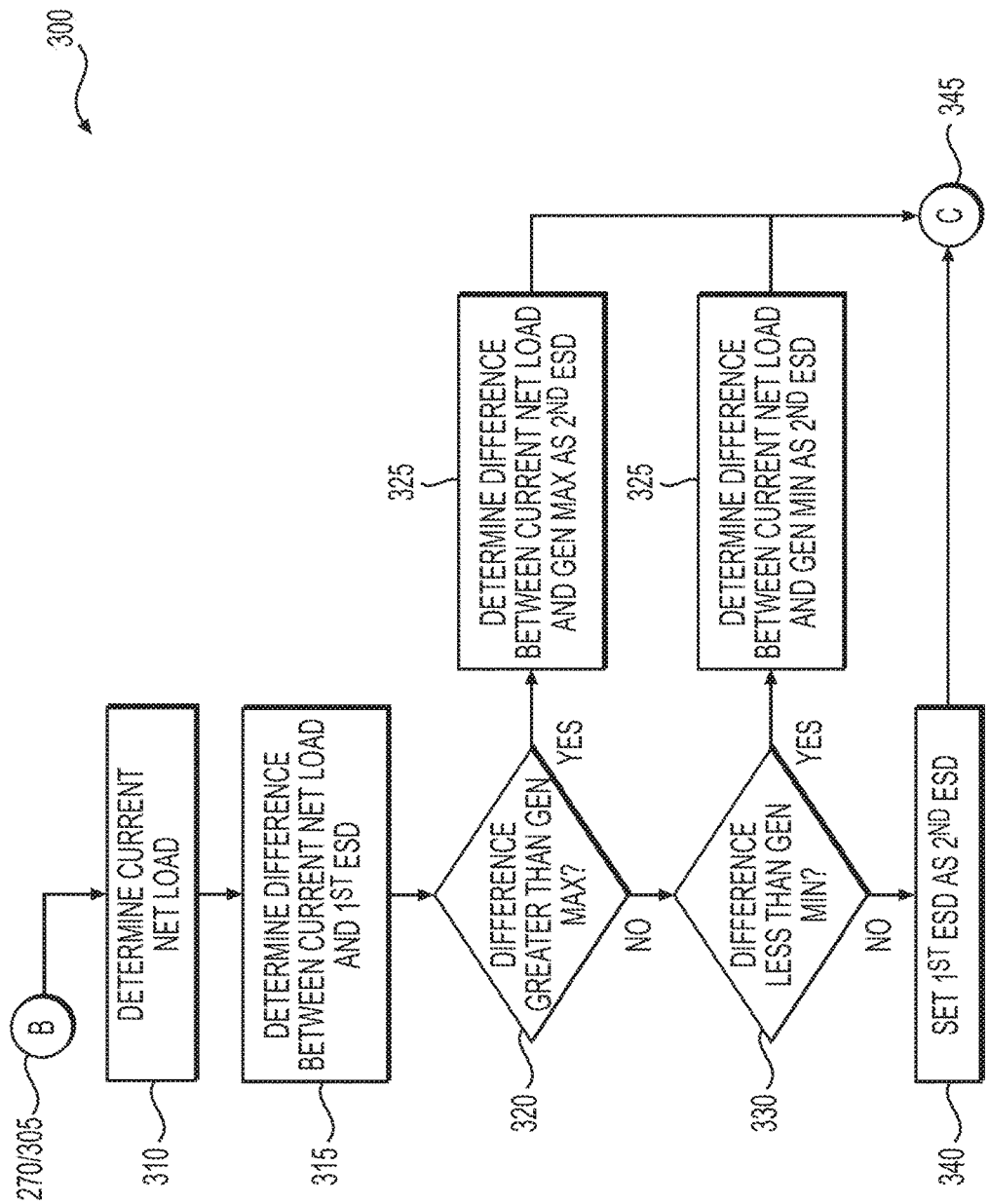
FIG. 3 depicts a flowchart for a generator set limit function, according to one or more embodiments.
Figure 4:
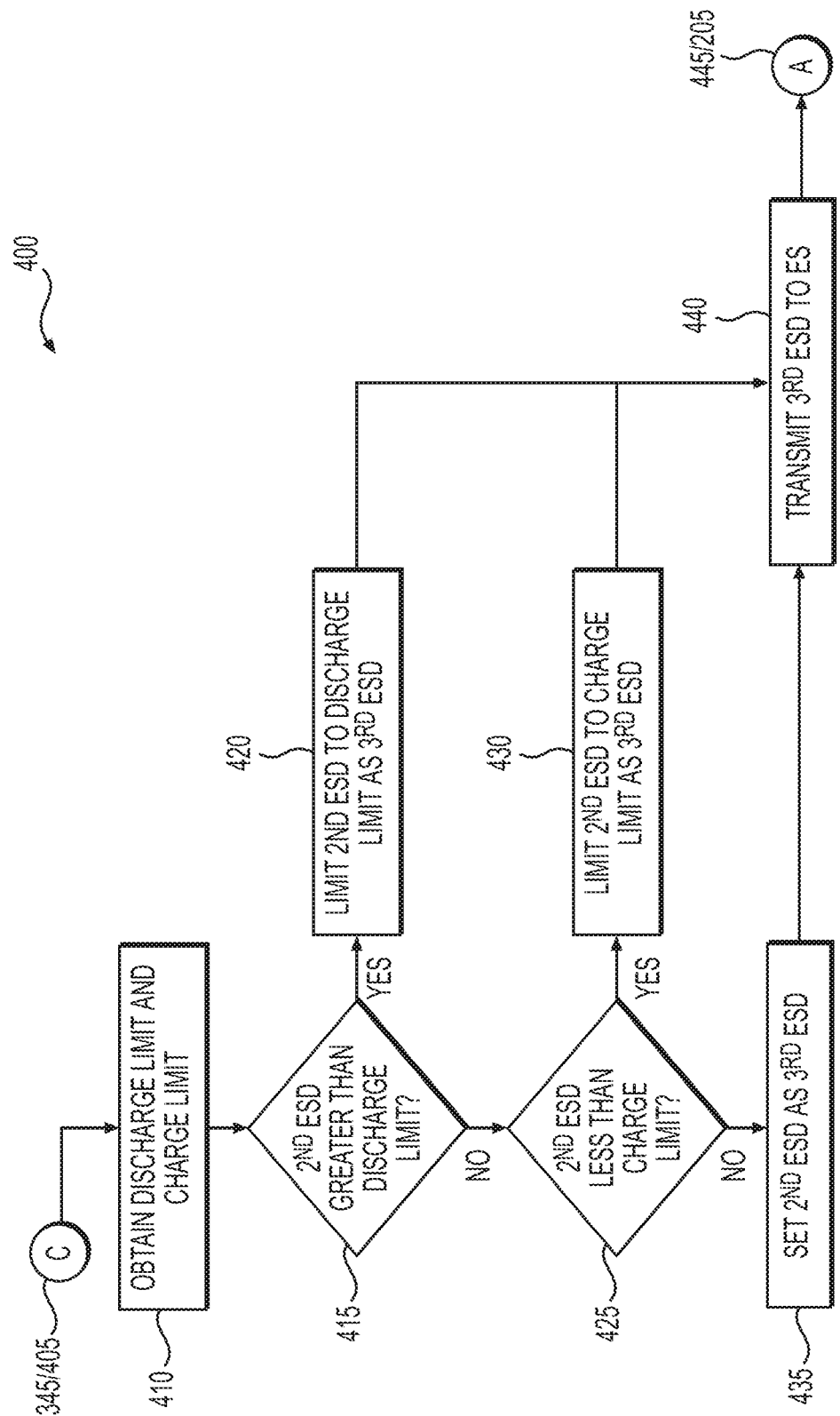
FIG. 4 depicts a flowchart for an energy store discharge/charge limit function, according to one or more embodiments.

FIGS. 2-4 depict flowcharts for off-grid load stabilization, according to one or more embodiments. FIG. 2 depicts a flowchart 200 for a load stabilization function and a SOC function, according to one or more embodiments. FIG. 3 indicates a flowchart 300 for a generator set limit function, according to one or more embodiments. FIG. 4 illustrates a flowchart 400 for an energy store discharge/charge limit function, according to one or more embodiments. The flowcharts 200, 300, and 400 may be performed by the controller 105C executing the control application, as discussed above. Generally, the process for off-grid load stabilization is broken into three sub-processes as shown in flowcharts 200, 300, and 400, depending on which function are activated.

Now referring to FIG. 2, for instance, the controller 105C may start the process of flowchart 200 at point A (block 205). If the load stabilization function is activated, the controller 105C may execute operations in blocks 210 through 225. To start the load stabilization function, the controller 105C may obtain a current load (block 210). For instance, the controller 105C may obtain the load of the at least one generator 105A by receiving the load data from the at least one generator 105A, as discussed above in relation to FIG. 1. The controller 105C may then obtain a window set point (block 215). For instance, the controller 105C may obtain the window set point based on a current time of a system clock, as discussed above in relation to FIG. 1. The controller 105C may then determine a moving average for the load based on the window set point (block 220). For instance, the controller 105C may determine the moving average for the load by retrieving past load data from the memory based on the window set point and use one of the moving average formulas for the retrieved past load data and the current load, as discussed above in relation to FIG. 1. The controller 105C may then determine a load smoothing power based on a difference between the moving average for the load and the current load (block 225). For instance, the controller 105C may determine the load smoothing power by subtracting the current load from the moving average for the load, as discussed above in relation to FIG. 1.

If the SOC function is activated, the controller 105C may execute operations in blocks 230 through 260. To start the SOC function, the controller 105C may obtain a current energy sum (block 230). For instance, the controller 105C may obtain the current energy sum by retrieving a current energy level of the at least one energy store 105B and summing (e.g., adding) the current energy levels for the at least one energy store 105B, as discussed above in relation to FIG. 1. The controller 105C may then obtain an energy at a target SOC (block 235). For instance, the controller 105C may obtain the energy at the target SOC by retrieving the data from the memory, as discussed above in relation to FIG. 1. The controller 105C may then determine a difference between the energy at the target SOC and the current energy sum (block 240). For instance, the controller 105C may determine the difference between the energy at the target SOC and the current energy sum by subtracting the current energy sum from the energy at the target SOC, as discussed above in relation to FIG. 1. The controller 105C may then obtain a SOC control gain (block 245). For instance, the controller 105C may obtain the SOC control gain by retrieving the SOC control gain variable from the memory, as discussed above in relation to FIG. 1. The controller 105C may then determine a SOC correction power based on the SOC control gain (block 250). For instance, the controller 105C may determine the SOC correction power by dividing the difference by the SOC control gain, as discussed above in relation to FIG. 1. The controller 105C may then determine whether the limit function is activated (block 255). For instance, the controller 105C may determine whether the limit function is on by determining whether the SOC of the at least one energy store 105B are less than the low-end critical threshold (either individual or collectively), as discussed above in relation to FIG. 1. In response to determining that the limit function is on (block 255: Yes), the controller 105C may then limit the SOC correction power to a max SOC bias power (block 260). For instance, the controller 105C may determine whether the SOC correction power is greater than the max SOC bias power; if greater than the max SOC bias power, the SOC correction power may be set to the max SOC bias power; and if equal to or less, the SOC correction power may be left as it is, as discussed above in relation to FIG. 1. In response to determining that the limit function is not activated (block 255: No), the controller 105C may proceed to block 265, without limiting the SOC correction power. For instance, the controller 105C may override the load smoothing function so as to charge the at least one energy store 105B, so that the at least one energy store 105B are capable of long term beneficial use (e.g., have a range of operation usable by the power system 105) and/or avoid degradation ranges, as discussed above in relation to FIG. 1.

The controller 105C may then determine a first ESD based on the load smoothing power and/or the SOC correction power (block 265). For instance, the controller 105C may sum the load smoothing power and the SOC correction power if both of the functionalities are activated, as discussed above in relation to FIG. 1.

The controller 105C may then proceed to point B (block 270). The controller 105C may start the process of flowchart 300 at point B (block 270/305). If the generator set limit function is activated, the controller 105C may execute operations in blocks 310 through 340. If the generator set limit function is not activated, these steps may be skipped.

To start the generator set limit function, the controller 105C may determine a current net load (block 310). For instance, the controller 105C may determine the current net load by adding the current load on the energy store(s) 105B to the current load of the at least one generator 105A, as discussed above in relation to FIG. 1.

The controller 105C may then determine a difference between the current net load and the first ESD (the difference)(block 315). For instance, the controller 105C may subtract the first ESD from the current net load, as discussed above in relation to FIG. 1.

The controller 105C may then determine whether the difference is greater than a generator set maximum threshold value (block 320). For instance, the controller 105C may retrieve a generator set maximum threshold value (GEN MAX) from the memory and determine whether the difference is greater than the GEN MAX, as discussed above in relation to FIG. 1. In response to determining that the difference is greater than a generator set max (block 320: Yes), the controller 105C may then determine a difference between the current net load and the GEN MAX as a second ESD (block 325). For instance, the controller 105C may subtract the GEN MAX from the current net load, as discussed above in relation to FIG. 1.

In response to determining that the difference is not greater than the generator set maximum threshold value (block 320: No), the controller 105C may then determine whether the difference is less than a generator set minimum threshold value (block 330). For instance, the controller 105C may retrieve a generator set minimum threshold value (GEN MIN) from the memory and determine whether the difference is less than the GEN MIN, as discussed above in relation to FIG. 1. In response to determining that the difference is less than the generator set minimum threshold value (block 330: Yes), the controller 105C may then determine a difference between the current net load and the GEN MIN as the second ESD (block 335). For instance, the controller 105C may subtract the GEN MIN from the current net load, as discussed above in relation to FIG. 1.

In response to determining that the difference is not less than the generator set minimum threshold value (block 330: No), the controller 105C may then set the first ESD as the second ESD (block 340).

The controller 105C may then proceed to point C (block 345). The controller 105C may start the process of flowchart 400 at point C (block 345/405).

If the energy store discharge/charge limit function is activated, the controller 105C may execute operations in blocks 410 through 440. If disabled, blocks 410 through 440 may be skipped. To start the energy store discharge/charge limit function, the controller 105C may obtain a discharge limit and charge limit (block 410). For instance, the controller 105C may obtain the discharge limit and the charge limit of the at least one energy store 105B (either individually or collectively), as discussed above in relation to FIG. 1.

The controller 105C may then determine whether the second ESD is greater than the discharge limit (block 415). For instance, the controller 105C may determine whether the second ESD is greater than the discharge limit of the at least one energy store 105B, as discussed above in relation to FIG. 1.

In response to determining that the second ESD is greater than the discharge limit (block 415: Yes), the controller 105C may then limit the second ESD to the discharge limit as a third ESD (block 420). For instance, the controller 105C may set the third ESD as the discharge limit, as discussed above in relation to FIG. 1.

In response to determining that the second ESD is not greater than the discharge limit (block 415: No), the controller 105C may then determine whether the second ESD is less than the charge limit (block 425). For instance, the controller 105C may determine whether the second ESD is less than the charge limit of the at least one energy store 105B, as discussed above in relation to FIG. 1.

In response to determining that the second ESD is less than the charge limit (block 425: Yes), the controller 105C may then limit the second ESD to the charge limit as the third ESD (block 430). For instance, the controller 105C may set the third ESD as the charge limit, as discussed above in relation to FIG. 1.

In response to determining that the second ESD is not less than the charge limit (block 425: No), the controller 105C may then set the second ESD as the third ESD (block 435).

The controller 105C may then transmit the third ESD to the at least one energy store 105B (block 440). For instance, the controller 105C may transmit an the third ESD, as discussed above in relation to FIG. 1, so that the at least one energy store 105B may inject/absorb power so that the at least one generator 105A do not see the load transient.

The controller 105C may then proceed to point A (block 445/205), thus restarting the process, which may be performed at predetermined time intervals or events.

Figure 5:
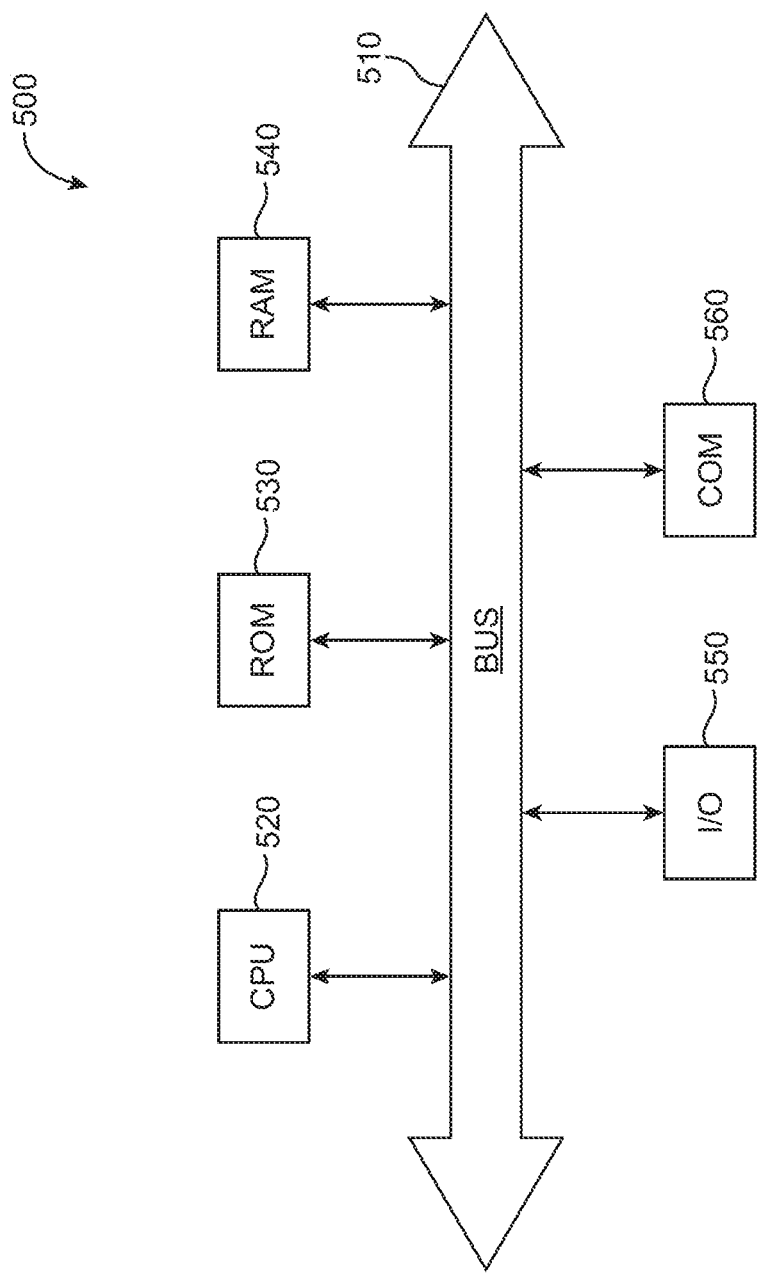
FIG. 5 depicts an example system that may execute techniques presented herein.

FIG. 5 depicts an example system that may execute techniques presented herein. FIG. 5 is a simplified functional block diagram of a computer that may be configured to execute techniques described herein, according to exemplary embodiments of the present disclosure. Specifically, the computer (or "platform" as it may not be a single physical computer infrastructure) may include a data communication interface 560 for packet data communication. The platform may also include a central processing unit ("CPU") 520, in the form of one or more processors, for executing program instructions. The platform may include an internal communication bus 510, and the platform may also include a program storage and/or a data storage for various data files to be processed and/or communicated by the platform such as ROM 530 and RAM 540, although the system 500 may receive programming and data via network communications. The system 500 also may include input and output ports 550 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a programmed controller or computer. Those skilled in the relevant art will appreciate that aspects of the present disclosure can be practiced with other communications, data processing, or computer system configurations, including: Internet appliances, hand-held devices, etc.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

INDUSTRIAL APPLICABILITY

The present disclosure may find application in off-grid power distribution systems.

The present disclosure may help protecting power quality of off-grid power distribution systems by limiting load transients experienced by generators, especially gas turbine generators.

Another aspect of the above disclosure is that energy stores of off-grid power distribution may be controlled to drive to an energy level of the energy stores to a target SOC, in accordance with a convergence time and a max SOC bias power. Occasionally, a SOC function may override the load stabilization function when the SOC of energy stores are less than a low-end critical threshold and/or greater than a high-end critical threshold It will be apparent to those skilled in the art that various modifications and variations can be made to the disclosed system without departing from the scope of the disclosure. Other embodiments of the system will be apparent to those skilled in the art from consideration of the specification and practice of the method disclosed herein. It is intended that the specification and examples be considered as exemplary only, with a true scope of the disclosure being indicated by the following claims and their equivalents.

What is claimed is:

1. A method for off-grid load stabilization of a power system comprising: at least one generator, at least one energy store, and a system bus, the method comprising:
   receiving generator data from the at least one generator and energy storage data from the at least one energy store;
   determining, based on the generator data and/or the energy storage data, a moving average of a system load on the at least one generator;
   determining, based on the generator data and/or the energy storage data, an instantaneous load value on the at least one generator;
   determining a first electronic storage dispatch (ESD) based on the moving average of the system load and the instantaneous load value on the at least one generator;
   providing the first ESD to the at least one energy store; and
   causing the at least one energy store to inject power to the system bus or absorb power from the system bus to maintain a frequency of the system bus in response to the at least one energy store receiving the first ESD.

2. The method of claim 1, wherein determining the first ESD further comprises:
   receiving a current load of the at least one generator;
   receiving a window set point;
   determining a moving average for the load based on the window set point; and
   determining a load smoothing power based on a difference between the moving average for the load and the current load.

3. The method of claim 1, wherein determining the ESD further comprises:
   determining whether a state of charge (SOC) function is enabled;
   in response to determining that the SOC function is enabled, updating the first ESD based on the energy storage data;
   determining whether a generator set limit function is enabled;
   in response to determining that the generator set limit function is enabled, determining a second ESD based on the generator data and the first ESD;
   determining whether an energy store discharge/charge limit function is enabled;
   in response to determining that the energy store discharge/charge limit function is enabled, determining a third ESD based on the energy storage data; and
   providing the third ESD to the at least one energy store.

4. The method of claim 3, wherein the SOC function further comprises:
   determining a current energy sum;
   determining an energy at a target SOC;
   determining a difference between the energy at the target SOC and the current energy sum;
   receiving a SOC control gain;
   determining a SOC correction power based on the SOC control gain and the difference between the energy at the target SOC and the current energy sum;
   determining whether a limit function is on;
   in response to determining that the limit function is on, limiting the SOC correction power to a max SOC bias power; and
   updating the first ESD based on the SOC correction power.

5. The method of claim 4, wherein the determining whether the limit function is on further comprises determining whether a SOC of the at least one energy store are less than a low-end critical threshold and/or greater than a high-end critical threshold.

6. The method of claim 4, wherein the generator set limit function further comprises:
   determining a current net load;
   determining a first difference comprising a difference between the current net load and the first ESD;
   determining whether the first difference is greater than a generator set maximum threshold value or less than a generator set minimum threshold value associated with the at least one generator;
   in response to determining that the first difference is greater than the generator set maximum threshold value, determining a difference between the current net load and the generator set maximum threshold value as the second ESD;
   in response to determining the first difference is less than the generator set minimum threshold value, determining a difference between the current net load and the generator set minimum threshold value as the second ESD; and
   in response to determining the first difference is not less than the generator set minimum threshold value and/or in response to determining the difference is not greater than the generator set maximum threshold value, setting the first ESD as the second ESD.

7. The method of claim 6, wherein the energy store discharge/charge limit function further comprises:
   receiving a discharge limit and charge limit associated with the at least one energy store;
   determining whether the second ESD is greater than the discharge limit or less than the charge limit;
   in response to determining that the second ESD is greater than the discharge limit, limiting the second ESD to the discharge limit as the third ESD;
   in response to determining that the second ESD is less than the charge limit, limiting the second ESD to the charge limit as the third ESD; and
   in response to determining that the second ESD is not greater than the discharge limit and/or in response to determining the second ESD is not less than the charge limit, setting the second ESD as the third ESD.

8. A system for off-grid load stabilization, the system comprising:

at least one generator;
at least one energy store;
a system bus;
at least one memory storing instructions; and
at least one processor executing the instructions to perform operations, the operations comprising:
  receiving generator data from the at least one generator and energy storage data from the at least one energy store;
  determining, based on the generator data and/or the energy storage data, a moving average of a system load on the at least one generator;
  determining, based on the generator data and/or the energy storage data, an instantaneous load value on the at least one generator;
  determining a first electronic storage dispatch (ESD) based on the moving average of the system load and the instantaneous load value on the at least one generator;
  providing the first ESD to the at least one energy store; and
  causing the at least one energy store to inject power to the system bus or absorb power from the system bus to maintain a frequency of the system bus in response to the at least one energy store receiving the first ESD.

9. The system of claim 8, wherein determining the first ESD further comprises:
  receiving a current load of the at least one generator;
  receiving a window set point;
  determining a moving average for the load based on the window set point; and
  determining a load smoothing power based on a difference between the moving average for the load and the current load.

10. The system of claim 8, wherein determining the ESD further comprises:
  determining whether a state of charge (SOC) function is enabled;
  in response to determining that the SOC function is enabled, updating the first ESD based on the energy storage data;
  determining whether a generator set limit function is enabled;
  in response to determining that the generator set limit function is enabled, determining a second ESD based on the generator data and the first ESD;
  determining whether an energy store discharge/charge limit function is enabled;
  in response to determining that the energy store discharge/charge limit function is enabled, determining a third ESD based on the energy storage data; and
  providing the third ESD to the at least one energy store.

11. The system of claim 10, wherein the SOC function further comprises:
  determining a current energy sum;
  determining an energy at a target SOC;
  determining a difference between the energy at the target SOC and the current energy sum;
  receiving a SOC control gain;
  determining a SOC correction power based on the SOC control gain and the difference between the energy at the target SOC and the current energy sum;
  determining whether a limit function is on;
  in response to determining that the limit function is on, limiting the SOC correction power to a max SOC bias power; and
  updating the first ESD based on the SOC correction power.

12. The system of claim 11, wherein the determining whether the limit function is on further comprises determining whether a SOC of the at least one energy store are less than a low-end critical threshold and/or greater than a high-end critical threshold.

13. The system of claim 11, wherein the generator set limit function further comprises:
  determining a current net load;
  determining a first difference comprising a difference between the current net load and the first ESD;
  determining whether the first difference is greater than a generator set maximum threshold value or less than a generator set minimum threshold value associated with the at least one generator;
  in response to determining that the first difference is greater than the generator set maximum threshold value, determining a difference between the current net load and the generator set maximum threshold value as the second ESD;
  in response to determining the first difference is less than the generator set minimum threshold value, determining a difference between the current net load and the generator set minimum threshold value as the second ESD; and
  in response to determining the first difference is not less than the generator set minimum threshold value and/or in response to determining the difference is not greater than the generator set maximum threshold value, setting the first ESD as the second ESD.

14. The system of claim 13, wherein the energy store discharge/charge limit function further comprises:
  receiving a discharge limit and charge limit associated with the at least one energy store;
  determining whether the second ESD is greater than the discharge limit or less than the charge limit;
  in response to determining that the second ESD is greater than the discharge limit, limiting the second ESD to the discharge limit as the third ESD;
  in response to determining that the second ESD is less than the charge limit, limiting the second ESD to the charge limit as the third ESD; and
  in response to determining that the second ESD is not greater than the discharge limit and/or in response to determining the second ESD is not less than the charge limit, setting the second ESD as the third ESD.

15. A non-transitory computer-readable medium storing instructions that, when executed by a processor, cause the processor to perform operations for off-grid load stabilization of a power system comprising at least one generator, at least one energy store, and a system bus, the operations comprising:
  receiving generator data from the at least one generator and energy storage data from the at least one energy store;
  determining, based on the generator data and/or the energy storage data, a moving average of a system load on the at least one generator;
  determining, based on the generator data and/or the energy storage data, an instantaneous load value on the at least one generator;
  determining a first electronic storage dispatch (ESD) based on the moving average of the system load and the instantaneous load value on the at least one generator;
  providing the first ESD to the at least one energy store; and causing the at least one energy store to inject power to the system bus or absorb power from the system bus to maintain a frequency of the system bus in response to the at least one energy store receiving the first ESD.

16. The non-transitory computer-readable medium of claim 15, wherein determining the first ESD further comprises:
   receiving a current load of the at least one generator;
   receiving a window set point;
   determining a moving average for the load based on the window set point; and
   determining a load smoothing power based on a difference between the moving average for the load and the current load.

17. The non-transitory computer-readable medium of claim 15, wherein determining the ESD further comprises:
   determining whether a state of charge (SOC) function is enabled;
   in response to determining that the SOC function is enabled, updating the first ESD based on the energy storage data;
   determining whether a generator set limit function is enabled;
   in response to determining that the generator set limit function is enabled, determining a second ESD based on the generator data and the first ESD;
   determining whether an energy store discharge/charge limit function is enabled;
   in response to determining that the energy store discharge/charge limit function is enabled, determining a third ESD based on the energy storage data; and
   providing the third ESD to the at least one energy store.

18. The non-transitory computer-readable medium of claim 17, wherein the SOC function further comprises:
   determining a current energy sum;
   determining an energy at a target SOC;
   determining a difference between the energy at the target SOC and the current energy sum;
   receiving a SOC control gain;
   determining a SOC correction power based on the SOC control gain and the difference between the energy at the target SOC and the current energy sum;
   determining whether a limit function is on;
   in response to determining that the limit function is on, limiting the SOC correction power to a max SOC bias power; and
   updating the first ESD based on the SOC correction power.

19. The non-transitory computer-readable medium of claim 18, wherein the generator set limit function further comprises:
   determining a current net load;
   determining a first difference comprising a difference between the current net load and the first ESD;
   determining whether the first difference is greater than a generator set maximum threshold value or less than a generator set minimum threshold value associated with the at least one generator;
   in response to determining that the first difference is greater than the generator set maximum threshold value, determining a difference between the current net load and the generator set maximum threshold value as the second ESD;
   in response to determining the first difference is less than the generator set minimum threshold value, determining a difference between the current net load and the generator set minimum threshold value as the second ESD; and
   in response to determining the first difference is not less than the generator set minimum threshold value and/or in response to determining the difference is not greater than the generator set maximum threshold value, setting the first ESD as the second ESD.

20. The non-transitory computer-readable medium of claim 19, wherein the energy store discharge/charge limit function further comprises:
   receiving a discharge limit and charge limit associated with the at least one energy store;
   determining whether the second ESD is greater than the discharge limit or less than the charge limit;
   in response to determining that the second ESD is greater than the discharge limit, limiting the second ESD to the discharge limit as the third ESD;
   in response to determining that the second ESD is less than the charge limit, limiting the second ESD to the charge limit as the third ESD; and
   in response to determining that the second ESD is not greater than the discharge limit and/or in response to determining the second ESD is not less than the charge limit, setting the second ESD as the third ESD.

* * * * *